United States Patent
Sueoka

Patent Number: 5,929,569
Date of Patent: Jul. 27, 1999

[54] INTEGRATED CIRCUIT WITH AN INTERNAL NOISE FILTER FOR DIRECTION INDICATOR LAMP FLASHER SYSTEM

[75] Inventor: Toshiaki Sueoka, Tokyo, Japan

[73] Assignee: Niles Parts Co., Ltd, Tokyo, Japan

[21] Appl. No.: 08/864,384

[22] Filed: May 28, 1997

[30] Foreign Application Priority Data

| May 29, 1996 | [JP] | Japan | 8-156392 |
|---|---|---|---|
| May 29, 1996 | [JP] | Japan | 8-156393 |
| May 29, 1996 | [JP] | Japan | 8-156394 |
| May 29, 1996 | [JP] | Japan | 8-156395 |
| May 29, 1996 | [JP] | Japan | 8-156396 |
| May 29, 1996 | [JP] | Japan | 8-156397 |

[51] Int. Cl.⁶ .................................. B60Q 1/38
[52] U.S. Cl. .................. 315/77; 315/200 A; 340/475; 307/10.8
[58] Field of Search .................. 315/77, 82, 83, 315/200 A; 340/465, 475; 307/10.8

[56] References Cited

U.S. PATENT DOCUMENTS

| 4,258,292 | 3/1981 | Kassfeldt | 315/77 X |
| 5,157,382 | 10/1992 | Stopa | 340/475 |
| 5,587,629 | 12/1996 | Gornstein | 315/200 A X |
| 5,672,861 | 9/1997 | Fairley et al. | 250/201.3 |

FOREIGN PATENT DOCUMENTS

| 6-115399 | 4/1994 | Japan | 340/475 |

*Primary Examiner*—Robert Pascal
*Assistant Examiner*—Justin P. Bettendorf
*Attorney, Agent, or Firm*—Ronald P. Kananen; Rader, Fishman & Grauer

[57] ABSTRACT

An integrated circuit for a flasher system which is inserted in a current path connected to direction indicator lamps of a vehicle for cyclically opening and closing the current path so as to flash the direction indicator lamps. The integrated circuit 21 includes a resistor 213B connected between a pin 21B of the integrated circuit and an input 213E of a comparator 213A, which is provided in a lamp burnout detecting section 213 of the integrated circuit 21. A noise filter is formed of the resistor 213B and the capacitor 213C connected to the input 213E of the comparator 213A. A resistor 212B is connected between a pin 21E of the integrated circuit and an input 212E of a comparator 212A in an oscillator section 212 of the integrated circuit 21. A noise filter is formed of the resistor 212B and a parasitic capacitor 212C connected to the input 212E of the comparator 212A. An input end and an output end of the comparator 212A are connected together through a hysteresis setting element 212F. A resistance 211B is connected between a terminal end 211E of a comparator 211A in a switch inputting section 211 and a terminal 21G of the integrated circuit 21. A noise filter is formed by the resistance 211B and a capacitor 211C provided at the terminal end 211E of the comparator 211A. A delay circuit 211F is provided in the switch inputting section 211. The flasher system prevents erroneous operation of direction indicator lamps due to noise or chattering signals caused by vibration.

7 Claims, 2 Drawing Sheets

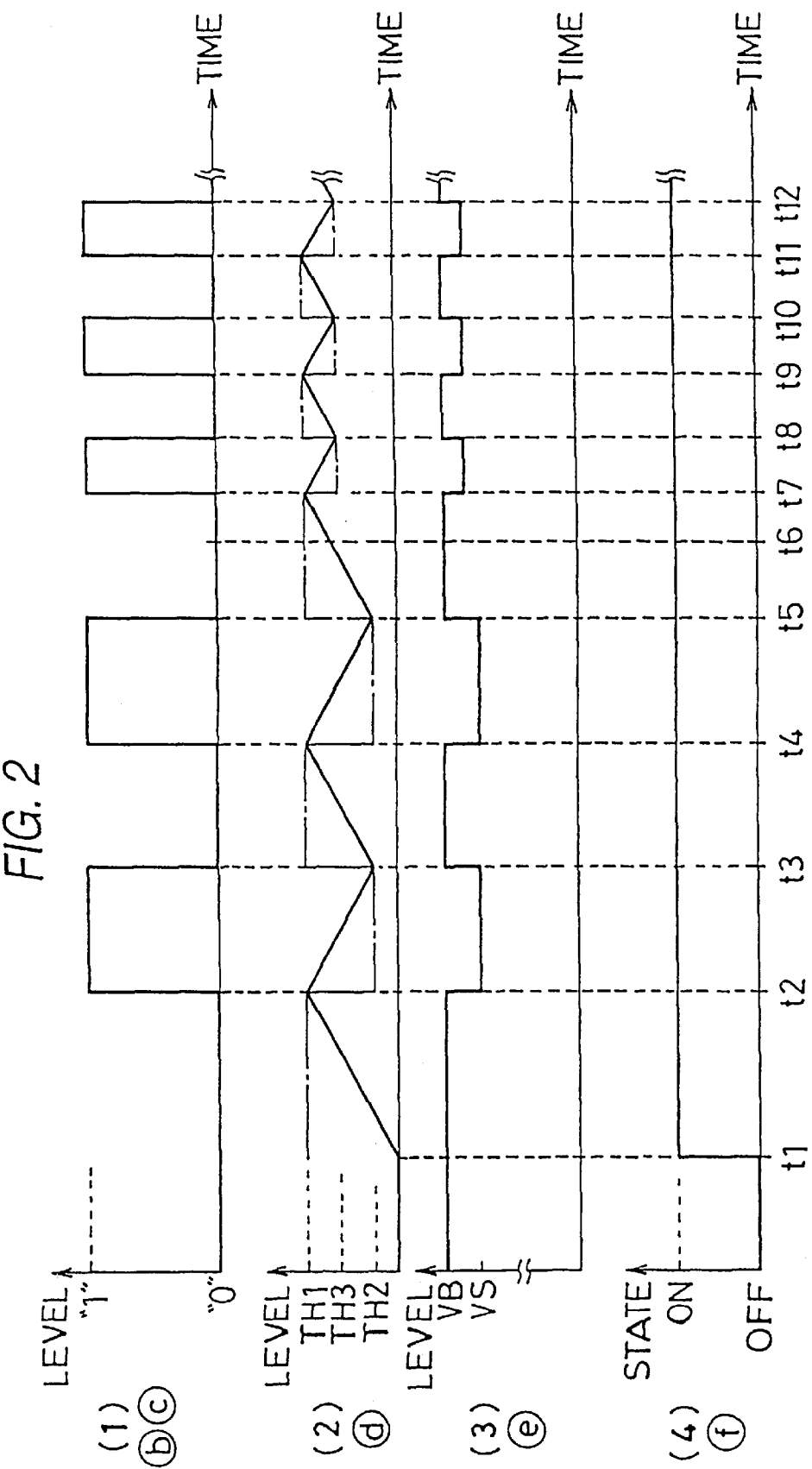

INTEGRATED CIRCUIT WITH AN INTERNAL NOISE FILTER FOR DIRECTION INDICATOR LAMP FLASHER SYSTEM

BACKGROUND OF THE INVENTION

1. Field of the Invention

The present invention relates generally to a direction indicator lamp flasher system adapted to flash direction indicator lamps of a vehicle. In particular, the present invention relates to an effective means for preventing a direction indicator flasher system from malfunctioning due to noise, and for preventing a direction indicator flasher system from malfunctioning due to so-called chattering signals, that might occur due to mechanical vibration of a movable contact piece during the turning ON of a contact of a relay or a turn-signal switch used for opening and closing an electrical circuit leading to the direction indicator lamps.

2. Description of the Related Art

A conventional direction indicator lamp flasher system is shown, for example, in Japanese Unexamined Patent Publication (Kokai) No. S61-166742. This conventional flasher system is configured by externally attaching a noise-absorbing capacitor to an integrated circuit, and connecting a flash-operation controlling circuit in an electrical circuit extending between a relay and a turn-signal switch, so that the operating states of the relay and the turn-signal switch are detected to control the operation of a flash-driving circuit.

However, with a prior art flasher system having a noise absorbing capacitor externally connected to the integrated circuit, as in the above-mentioned conventional art, the noise absorbing effect greatly varies depending on, for example, the mounting location of the noise absorbing capacitor and the shape of pattern traces formed on the printed circuit board on which the flasher system is assembled. This dependence of the noise absorbing effect on the mounting location of the noise absorbing capacitor and the shape of pattern traces necessitates repeated assembly attempts when designing the pattern traces of the circuit board. As a consequence, there has been a problem of necessitating many developing processes, thereby leading to much development work.

Moreover, a capacitor having a relatively large capacitance is required in some cases in order to increase the noise absorbing effect. In addition, when closing the contacts of the turn signal switch and relay that switches on and off the electrical path connecting to the direction indicator lamps, the mechanical vibration of the movable contacts results in chattering signals which in turn cause the system to malfunction.

SUMMARY OF THE INVENTION

It is an object of the present invention to provide an integrated circuit for a direction indicator lamp flasher system that solves the problems associated with the conventional flasher system described above.

More specifically, an object of the invention is to provide an integrated circuit for a flasher system for controlling direction indicator lamps, in which the noise absorbing effect of the system does not vary depending on the shape of the pattern traces on the printed circuit board on which the flasher system is assembled and, therefore, the design of pattern traces may be carried out with more degrees of freedom, the system can be developed in a shorter time, and the need for an external noise-absorbing capacitor is eliminated.

Another object of the invention is to provide an integrated circuit which eliminates a problem wherein as the voltage on the capacitor approaches the threshold voltage, the comparator becomes susceptible to noise so that noise affects the logic state of the output of the comparator, thereby resulting in instability of the oscillator section when the comparator compares the charging/discharging voltage on the capacitor with the threshold voltage outputted from the reference voltage source.

Another object of the invention is to provide an integrated circuit for a flasher system for controlling direction indicator lamps wherein the system is free from malfunction even if chattering signals are developed due to the mechanical vibrations of the movable contacts of the relay and turn signal switch, which is used to open and close the electrical path connected to the direction indicator lamps, when the contacts of the relay and turn signal switch are closed.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

In order to achieve the aforementioned objects, the present invention provides an integrated circuit for a flasher system for blinking direction indicator lamps, the flasher system being inserted in the electrical path connected to the direction indicator lamps and cyclically opening and closing the electrical path to flash the direction indicator lamps. The integrated circuit is characterized by a lamp burnout detecting section incorporated therein, a resistor connected between an input of the comparator and a terminal of the integrated circuit, and a noise filter formed by the resistor and a capacitor connected to the input of the comparator. The capacitor is preferably a parasitic capacitance in the integrated circuit.

According to another aspect of the present invention, an integrated circuit is provided for a flasher system for blinking direction indicator lamps in which the system is inserted in the electrical path connected to the direction indicator lamps of a vehicle and cyclically opens and closes the electrical path to flash the direction indicator lamps. According to this aspect of the invention, the integrated circuit incorporates an oscillator section therein, and a resistor is connected between an input of a comparator in the oscillator section and a terminal of the integrated circuit. The resistor and a capacitor, in the form of a parasitic capacitance in the integrated circuit, together form a noise filter.

According to another aspect of the present invention, an integrated circuit is provided for a flasher system for blinking direction indicator lamps, the flasher system being inserted in the electrical path connected to the direction indicator lamps and cyclically opening and closing the electrical path so as to flash the direction indicator lamps. According to this aspect of the invention, the integrated circuit is provided in the flasher system and incorporates an oscillator section therein. A resistor is connected between an input terminal of a comparator in the oscillator section and a terminal of the integrated circuit, forming a noise filter together with a capacitor connected to the input terminal of the comparator.

According to yet another aspect of the present invention, an integrated circuit is provided for a direction indicator lamp flasher system, the flasher system being connected in an electrical circuit leading to direction indicator lamps and periodically opening and closing the electricity-feed circuit to cause flashing by the direction indicator lamps. According to this aspect of the invention, the integrated circuit comprises: a switch inputting section built in the integrated circuit, the integrated circuit being provided in the flasher system; a resistance connected between a terminal end of a comparator provided in the switch inputting section and a terminal of the integrated circuit; and a noise filter formed by the resistance and a capacitor provided at a terminal end of the comparator. Also, according to this aspect of the invention, the capacitor preferably comprises an internal parasitic capacitance present within the integrated circuit.

According to yet another aspect of the present invention, an integrated circuit is provided for a direction indicator lamp flasher system, the flasher system being connected in an electrical circuit leading to direction indicator lamps and periodically opening and closing the circuit to cause flashing by the direction indicator lamps. According to this aspect of the invention, the integrated circuit comprises: an oscillating section built in the integrated circuit, the integrated circuit being incorporated in the flasher system; a comparator provided in the oscillating section; and a hysteresis setting element through which an input end and an output end of the comparator are connected together.

According to yet another aspect of the present invention, an integrated circuit is provided for a direction indicator lamp flasher system, the flasher system being connected in an electrical circuit leading to direction indicator lamps and periodically opening and closing the circuit to cause flashing by the direction indicator lamps. According to this aspect of the invention, the integrated circuit comprises: a switch inputting section built in the integrated circuit, the integrated circuit being provided in the flasher system; and a delay circuit provided in the switch inputting section at a connecting point thereof to a terminal of the integrated circuit.

BRIEF DESCRIPTION OF THE DRAWINGS

The present invention will become more clearly appreciated as the disclosure of the invention is made with reference to the accompanying drawings. In the drawings:

FIG. 2 is a timing chart illustrating the operation of the embodiment shown in FIG. 1, wherein waveform (1) shows the levels at point b or point c in FIG. 1, waveform (2) shows the levels at point d in FIG. 1, waveform (3) shows the levels at point e in FIG. 1, and waveform (4) shows the operation condition of the turn signal switch.

DETAILED DESCRIPTION OF THE PREFERRED EMBODIMENT

Figure 1:
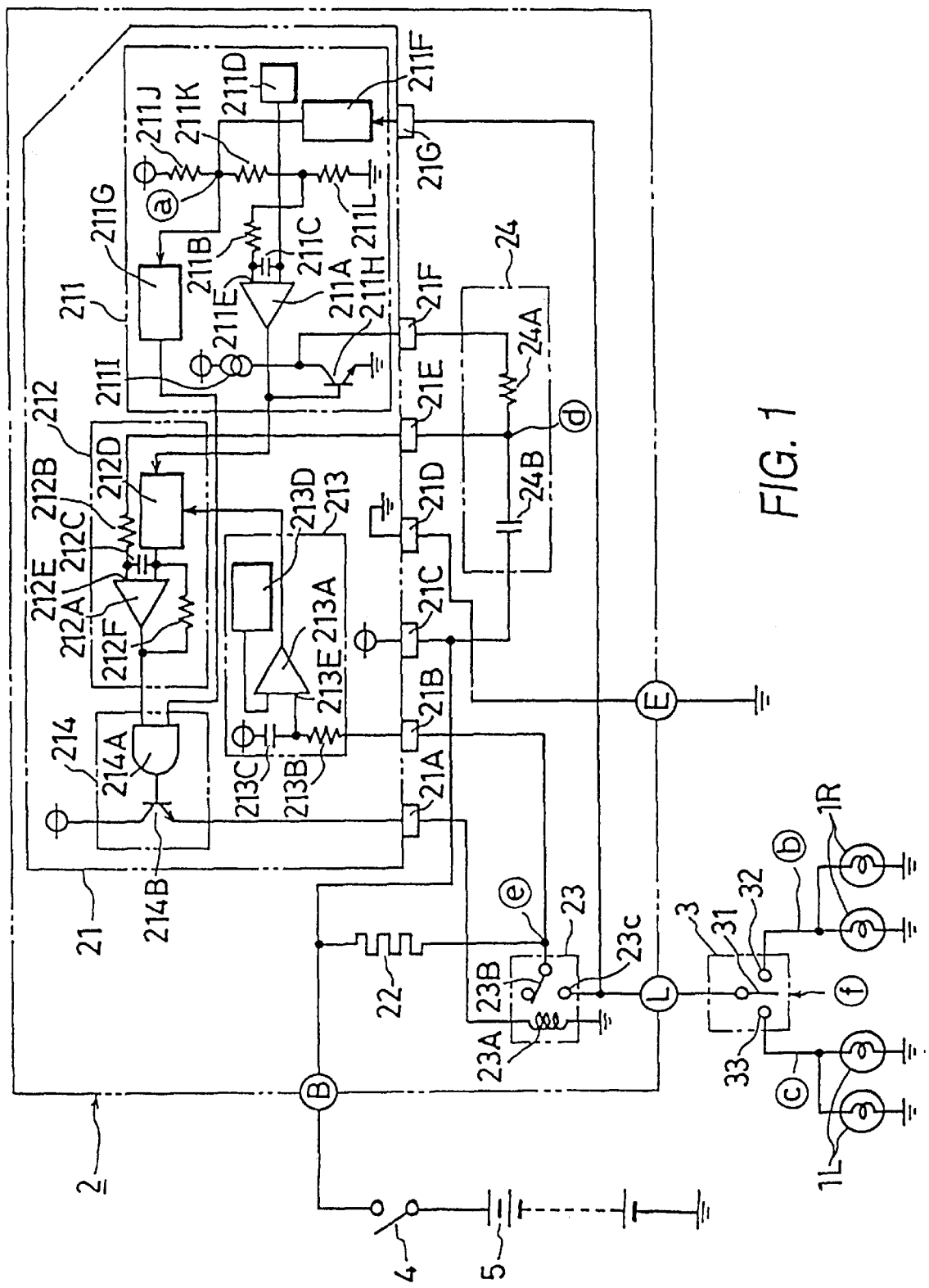
FIG. 1 is an electric circuit diagram of a flasher system according to a preferred embodiment of the present invention.

A preferred embodiment of the present invention will now be described, by way of example, with reference to FIGS. 1 and 2 of the accompanying drawings.

References 1R and 1L denote existing direction indicator lamps provided on the left and right sides of a vehicle. Reference 3 indicates a turn signal switch which includes a movable contact 31, a right contact 32, and a left contact 33. The turn signal switch 3 shifts to the on or off position when a lever (not shown) is operated. The movable contact 31 is connected to a flasher system 2, and the right and left contacts 32 and 33 are connected to the right and left direction indicator lamps 1R and 1L, respectively. The turn signal switch 3 forms a part of a combination switch assembly which includes various other operation switches, such as the switches for the lighting system and the switches for the windshield wiper system. The combination switch assembly incorporates the flasher system 2 therein.

The flasher system 2 is inserted in the electrical path connected to the direction indicator lamps 1R and 1L of the vehicle, and cyclically opens and closes the electrical path to cause the direction indicator lamps 1R and 1L to flash. The flasher system 2 includes an integrated circuit 21, a current detecting resistor 22, a relay 23, and an externally attached element group 24 connected to the integrated circuit 21.

The integrated circuit 21 is generally referred to as a flasher IC and incorporates a switch-signal section 211, an oscillator section 212, a lamp burnout detecting section 213, and an output section 214. These sections 211–214 will now be described in detail.

In accordance with the states of the turn signal switch 3, the switch-signal section 211 outputs signals to the oscillator section 212, the output section 214, and the externally attached element group 24 connected to the integrated circuit. The switch-signal section 211 includes a comparator 211A, a noise filter resistor 211B, a capacitor 211C, a reference voltage source 211D, a delay circuit 211F, a switch-state detecting circuit 211G, a transistor 211H, a constant current source 211I, and voltage-dividing resistors 211J–211L.

The switch-signal section 211 will now be described in more detail. Connected to the non-inverting input terminal 211E of the comparator 211A are the resistor 211B and capacitor 211C that form a filter to reject noise entering the comparator 211A. In this relation, the capacitor 211C utilizes a parasitic capacitance created between the conductor circuits which are internally adjacent in the integrated circuit 21. The delay circuit 211F is connected to the pin 21G of the integrated circuit 21 and rejects chattering signals resulting from the operations of the turn signal switch 3 and relay 23, thereby preventing the switch-signal section 211 from malfunctioning.

The switch-state detecting circuit 211G outputs a voltage of logic "0" when the turn signal switch 3 is in the OFF state (open), and a voltage of logic "1" when the turn signal switch 3 is in the ON state (closed). More specifically, the switch-state detecting circuit 211G has a so-called window comparator configuration. The switch-state detecting circuit 211G outputs a voltage of logic "1" to the output section 214 when the turn signal switch 3 is shifted to the ON position so that the voltage at the junction a of the resistors 211J and 211K becomes a logic "0" or "1", and outputs a voltage of logic "0" when the turn signal switch 3 is shifted to the OFF position so that the voltage at the junction a becomes an intermediate value set up by the resistors 211J–211L.

The comparator 211A has an inverting input terminal connected to the reference voltage source 211D. The output of the comparator 211A is connected to the base of the transistor 211H and to the oscillator section 212. The transistor 211H has its collector connected to the constant current source 211I and the pin 21F of the integrated circuit 21, and its emitter connected to the ground.

The oscillator section 212 will now be described. The oscillator section 212 cooperates with the transistor 211H of the switch-signal section 211 and the externally attached element group 24 to operate as an oscillator. The oscillator section 212 includes the comparator 212A, a resistor 212B for a noise filter, a capacitor 212C, a reference voltage source 212D, and a hysteresis causing feedback element 212F, all of which are connected to one another.

The comparator 212A has its non-inverting input terminal 212E connected to the resistor 212B and capacitor 212C, thereby forming a noise filter to reject noise entering the comparator 212A. The resistor 212B is also connected to the pin 21E of the integrated circuit 21. In this connection, the capacitor 212C utilizes the parasitic capacitance created between the conductor circuits which are internally adjacent in the integrated circuit 21, similarly to the capacitor 211C.

The comparator 212A has its inverting input terminal connected to the reference voltage source 212D. The reference voltage source 212D receives a signal from the switch-signal section 211 and outputs a first threshold voltage TH1 or a second threshold voltage TH2 to the inverting input terminal of the comparator 211A depending on the received signal. In response to the burnout detection signal outputted from the lamp burnout detecting section 213, the reference voltage source 212D switches its output from the second threshold voltage TH2 to a third threshold voltage TH3 and feeds the third threshold voltage TH3 to the inverting input terminal of the comparator 212A, so that the period of the output of the oscillator section 212 becomes shorter. The values of the threshold voltages TH1, TH2, and TH3 are set in a relation such that TH1>TH3>TH2.

The output terminal of the comparator 212A is connected to the output section 214 and is fed back to the inverting input terminal of the comparator 212A via the feedback element 212F to create a hysteresis characterization effect for stable oscillation.

Next, the lamp burnout detecting section 213 will be described. The lamp burnout detecting section 213 detects the voltage drop across the current detecting resistor 22. When the voltage drop is at or below a predetermined value, the section 213 outputs a burnout detection signal having a logic "1" which indicates a burnout of a direction indicator lamp 1R and 1L. The burnout detection signal is outputted to the oscillator section 212. The lamp burnout detecting section 213 includes the comparator 213A, a noise filter resistor 213B, a capacitor 213C, and a reference voltage source 213D.

The comparator 213A has its non-inverting input terminal 213E connected to the resistor 213B and capacitor 213C, thereby forming a noise filter to reject the incoming noise. The resistor 213B is connected to the pin 21B of the integrated circuit 21. In this connection, the capacitor 213C utilizes parasitic capacitance created between the conductor circuits which are internally adjacent in the integrated circuit 21, similarly to the capacitor 211C.

The comparator 213A has its inverting input terminal connected to the reference voltage source 213D. The reference voltage source 213D generates a threshold voltage having a characteristic in accordance with the voltage-to-current relationship of the direction indicator lamps 1R and 1L. The reference voltage source 213D is a circuit which is a combination of resistors and non-linear elements (not shown). The output terminal of the comparator 213A is connected to the oscillator section 212.

The output section 214 will now be described. The output section 214 drives the relay 23 in accordance with a signal outputted from the switch-signal section 211 and the oscillator section 212. The output section 214 includes an AND gate 214A and a transistor 214B connected to each other. The AND gate 214A has its input terminals connected to the switch-signal section 211 and oscillator section 212, respectively. The AND gate 214A has its output terminal connected to the base of the transistor 214B. The emitter of the transistor 214B is connected to the pin 21A of the integrated circuit 21. The pin 21C of the integrated circuit 21 is a positive supply voltage terminal, and the pin 21D is a negative supply voltage terminal.

The integrated circuit 21 configured as above is connected to other parts that form the flasher system 2, i.e., the current detecting resistor 22, the relay 23, and the externally attached element group 24 connected to the integrated circuit. These structural elements will now be described as follows. The current detecting resistor 22 is a resistor across which a voltage drop of about 100 mV is developed, the voltage drop being proportional to the current flowing through the direction indicator lamps 1R and 1L. One end of the current detecting resistor 22 is connected to the terminal B of the flasher system 2 and the pin 21C of the integrated circuit 21, and the other end is connected to the relay 23 and pin 21B of the integrated circuit 21.

The relay 23 opens and closes the electrical path that carries the energizing current outputted from the integrated circuit 21 to the direction indicator lamps 1R and 1L. The relay 23 includes a coil 23A, a movable contact 23B, and fixed contacts 23C. One end of the coil 23A is connected to the pin 21A of the integrated circuit 21, and the other end is connected to the ground. The movable contact 23B is connected to the current detecting resistor 22, and the fixed contact 23C is connected to the terminal L of the flasher system 2 and the pin 21G of the integrated circuit 21.

The externally attached element group 24 connected to the integrated circuit 21 determines the oscillation period of the oscillator section 212 in accordance with the time constant obtained by multiplying the resistance of the resistor 24A and the capacitance of the capacitor 24B. The resistor 24A is connected between the pins 21F and 21E of the integrated circuit 21. The capacitor 24B is connected between the pins 21E and 21C of the integrated circuit 21. The pin 21D of the integrated circuit 21 is connected to the terminal E of the flasher system 2.

The flasher system 2 configured as above has the terminal B connected via an ignition switch 4 to the positive electrode of a DC power supply 5, the terminal L connected via the turn signal switch 3 to the direction indicator lamps 1R and 1L, and the terminal E connected to the ground.

The operation of the aforementioned embodiment will now be described with reference to the timing chart shown in FIG. 2. If the turn signal switch 3 is in the OFF state when the ignition switch 4 is turned on, then the voltage at the point a in the switch-signal section 211 is an intermediate voltage resulting from the voltage-dividing effect of the resistors 211J–211L, so that the switch-state detecting circuit 211G outputs a voltage of logic "0" to the output section 214. In this condition, the output of the AND gate 214A in the output section 214 is of a logic "0" so that the transistor 214B is in the OFF state. As a consequence, no energizing current flows through the coil 23A of the relay 23 and, hence, the movable contact 23B will not contact with the fixed contact 23C.

Upon shifting the turn signal switch 3 to, for example, the right at time t1 to the ON position as depicted by waveform (4) in FIG. 2, the voltage at point a immediately drops to a logic "0", so that the switch-state detecting circuit 211G outputs a voltage of a logic "1" to the output section 214. At the same time, the non-inverting input terminal of the comparator 211A becomes a logic "0", thereby causing the output of the comparator 211A to become a logic "0" which turns off the transistor 211H. Thus, the pin 21F of the integrated circuit 21 becomes a logic "1" so that the capacitor 24B of the externally attached element group 24 begins to discharge. Thus, the voltage at point d shown in FIG. 1 starts to increase from time t1 as depicted by waveform (2) in FIG. 2.

When the voltage at point d reaches, at time t2, the first threshold voltage TH1 outputted from the reference voltage source 212D as depicted by waveform (2) in FIG. 2, the output of the comparator 212A in the oscillator section 212 turns to a logic "1". Therefore, the output of the AND gate 214A in the output section 214 becomes a logic "1", so that the transistor 214B turns on, causing an energizing current to flow through the coil 23A of the relay 23. This causes the movable contact 23B to shift to the fixed contact 23C. The voltage at point b becomes a logic "1" at time t2 as depicted by waveform (1) in FIG. 2, and the direction indicator lamp 1R on the right side comes on while, at the same time, the pin 21G of the integrated circuit 21 becomes a logic "1".

When the voltage at the pin 21G of the integrated circuit 21 becomes a logic "1" at time t2, the voltage at point a also becomes a logic "1", so that the switch-state detecting circuit 211G continues to output a voltage of a logic "1" to the output section 214. At this time, the non-inverting input terminal 211E of the comparator 211A becomes a logic "1" and, therefore, the output of the comparator 211A becomes a logic "1" which turns the transistor 211H on. Thus, the pin 21F of the integrated circuit 21 turns to a logic "0", so that the capacitor 24B of the externally attached element group 24 starts to be charged, thereby causing the voltage at point d to decrease from time t2 as depicted by waveform (2) in FIG. 2. At the same time, the comparator 211A outputs a logic "1" to the reference voltage source 212D of the oscillator section 212 and, therefore, the reference voltage source 212D outputs the second threshold voltage TH2.

When the voltage at point d reaches, at time t3, the second threshold voltage TH2 outputted from the reference voltage source 212D, as depicted by waveform (2) in FIG. 2, the output of the comparator 212A of the oscillator section 212 turns to a logic "0". As a result, the output of the AND gate 214A of the output section 214 becomes a logic "0", which turns the transistor 214B off so that no energizing current flows through the coil 23A of the relay 23 causing the movable contact 23B to leave the fixed contact 23C. As a result, the voltage at point b in FIG. 1 becomes a logic "0" at time t3, as depicted by waveform (1) in FIG. 2, so that the direction indicator lamp 1R on the right side goes off and the voltage of the pin 21G of the integrated circuit 21 becomes a logic "0". Thereafter, the direction indicator lamp 1R on the right side cycles on and off at predetermined intervals in a similar manner.

If at least one of the direction indicator lamps 1R on the right side burns out at time t6, the voltage drop across the current detecting resistor 22 decreases, so that the voltage VS at point e increases as depicted by waveform (3) in FIG. 2 approaching the voltage VB on the terminal B of the flasher system 2. Then, the voltage at the non-inverting input terminal of the comparator 213A of the lamp burnout detecting section 213 becomes higher than the threshold voltage outputted from the reference voltage source 213D, whereby the comparator 213A outputs a logic "1". In response to the logic "1" outputted from the comparator 213A, the reference voltage source 212D in the oscillator section 212 switches its output from the second threshold voltage TH2 to the third threshold voltage TH3.

As depicted by waveform (2) in FIG. 2, when the voltage at point d reaches the third threshold voltage at times t8, t10, and t12, the direction indicator lamps 1R on the right side go off. In short, when one of the direction indicator lamps 1R burns out, the direction indicator lamp 1R cycles on and off at shorter intervals informing the driver of the burnout of the direction indicator lamp 1R.

Although the operation has been described with reference to the case in which the turn signal switch 3 is shifted to the right side into the ON position, the direction indicator lamp 1L also cycles on and off at predetermined intervals when the turn signal switch 3 is shifted to the left side into the ON position if one of the direction indicator lamps 1L has burned out. In this case, the waveform at point c shown in FIG. 1 is similar to that at point d, as depicted by waveform (1) in FIG. 2.

In the present invention, the flasher system is inserted in the current path connected to the direction indicator lamps of the vehicle and cyclically opens and closes the current path to flash the direction indicator lamps. The flasher system incorporates an integrated circuit having the lamp burnout detecting section. A resistor is connected between the input terminal of the comparator in the lamp burnout detecting section and the pin of the integrated circuit. The resistor cooperates with a capacitor connected to the input terminal of the comparator to form a noise filter.

The integrated circuit of the flasher system also incorporates an oscillator section therein. A resistor is connected between the input terminal of the comparator in the oscillator section and a pin of the integrated circuit. The resistor cooperates with a capacitor connected to the input terminal to form a noise filter, the capacitor being a parasitic capacitance in the integrated circuit.

The integrated circuit of the flasher system also has a switch inputting section built therein. A resistor is connected between a terminal end of a comparator provided in the switch inputting section and a terminal of the integrated circuit. A noise filter is formed by the resistor and a capacitor provided at a terminal end of the comparator.

Thus, the integrated circuit not only effectively prevents malfunction of the lamp burnout detecting section and the oscillator section in the integrated circuit due to noise, but also renders the noise absorbing effect free from the shape of pattern traces on the printed circuit board on which the flasher system is assembled, and thus the design of pattern traces may be carried out with more degrees of freedom. This integrated circuit allows the system for flashing the direction indicator lamp to be developed in a shorter time. The integrated circuit also eliminates the necessity for an external noise absorbing capacitor, as used in the prior art flasher systems. In addition, the capacitor for the noise filter may have a value as small as an internal parasitic capacitance of the integrated circuit.

The integrated circuit of the flasher system also has a hysteresis causing feedback element in the oscillator through which an input end and an output end of the comparator in the oscillator section are connected together. Thus, the oscillating section can operate stably even when experiencing noise upon approaching of charging or discharging voltage of a capacitor toward a threshold voltage, when a comparator incorporated in the oscillating section of the integrated circuit inversive operates by comparing between a threshold voltage transmitted from a reference voltage source and the charging or discharging voltage of the capacitor in an externally attached element group.

The integrated circuit of the flasher system also has a delay circuit provided in the switch inputting section at a connecting point thereof to a terminal of the integrated circuit. The delay circuit provides an effect wherein the direction indicator lamp flasher system is free from erroneous operation if a chattering signal is generated due to mechanical vibration of a movable contact piece during turning ON of a contact of a relay or a turn-signal switch used for opening and closing the electrical circuit leading to the direction indicator lamps.

It will be appreciated that the present invention is not limited to the exact construction that has been described above and illustrated in the accompanying drawings, and that various modifications and changes can be made without departing from the scope and spirit thereof. It is intended that the scope of the invention only be limited by the appended claims and equivalents thereof.

What is claimed is:

1. A flasher system (2) for blinking direction indicator lamps (1R, 1L), the flasher system being inserted in a current path connected to direction indicator lamps (1R, 1L) of a vehicle and cyclically opening and closing the current path so as to flash the direction indicator lamps (1R, 1L), the flasher system being subject to unwanted noise comprising:

an integrated circuit (21) having a lamp burnout detecting section (213) therein; and a noise filter removing said unwanted noise including a resistor (213B) connected between an input (213E) of a comparator (213A) in the lamp burnout detecting section (213) and a pin (21B) of the integrated circuit (21), the resistor (213B) cooperating with a capacitor (213C) connected to the input (213E) of the comparator (213A).

2. The flasher system for blinking direction indicator lamps according to claim 1, wherein the capacitor (213C) is a parasitic capacitance in the integrated circuit (21).

3. A flasher system (2) for blinking direction indicator lamps (1R, 1L), the flasher system being inserted in a current path connected to direction indicator lamps (1R, 1L) of a vehicle and cyclically opening and closing the current path so as to flash the direction indicator lamps (1R, 1L), the flasher system being subject to unwanted noise comprising:

an integrated circuit (21) having a oscillator section (212) therein; and a resistor (212B) connected between an input (212E) of a comparator (212A) in the oscillator section (212) and a pin (21E) of the integrated circuit (21), the resistor (212B) cooperating with a capacitor (212C) in the form of a parasitic capacitance in the integrated circuit (21) to form a noise filter for removing said unwanted noise.

4. A flasher system (2) for blinking direction indicator lamps (1R, 1L), the flasher system (2) being inserted in a current path connected to direction indicator lamps (1R, 1L) of a vehicle and cyclically opening and closing the current path so as to flash the direction indicator lamps (1R, 1L), the flasher system being subject to unwanted noise comprising:

an integrated circuit (21) having a oscillator section (212) therein; and a resistor (212B) connected between an input (212E) of a comparator (212A) in the oscillator section (212) and a pin (21E) of the integrated circuit (21), the resistor (212B) cooperating with a capacitor (212C) connected to the input (212E) of the comparator (212A) to form a noise filter for removing said unwanted noise.

5. An integrated circuit for a direction indicator lamp flasher system, said flasher system (2) subject to unwanted noise being connected in an electrical circuit leading to direction indicator lamps (1R, 1L) and periodically opening and closing said electrical circuit to cause flashing by said direction indicator lamps (1R, 1L), the integrated circuit comprising:

a switch inputting section (211) built in said integrated circuit (21), said integrated circuit being provided in said flasher system (2);

a resistance (211B) connected between a terminal and (211E) of a comparator (211A) provided in said switch inputting section (211) and a terminal (21G) of said integrated circuit; and a noise filter removing said unwanted noise formed by said resistance (211B) and a capacitor (211C) provided at a terminal end (211E) of said comparator (211A).

6. The integrated circuit for a direction indicator lamp flasher system according to claim 5, wherein said capacitor comprises an internal parasitic capacitance present within said integrated circuit (21).

7. An integrated circuit for a direction indicator lamp flasher system, said flasher system (2) subject to unwanted noise being connected in an electrical circuit leading to direction indicator lamps (1R, 1L) and periodically opening and closing said electrical circuit to cause flashing by said direction indicator lamps (1R, 1L), the integrated circuit comprising:

an oscillating section (212) built in said integrated circuit (21), said integrated circuit being incorporated in said flasher system (2);

a comparator (212A) provided in said oscillating section (212);

a feedback element (212F) through which an input end and an output end of said comparator are connected together; and means within said flasher system for filtering said unwanted noise, said filtering means coupled to said comparator (212A) and including a resistor and capacitor.

* * * * *